June 30, 1964 R. E. BUSCH 3,138,961
INTERMITTENT DRIVE MECHANISM
Filed May 22, 1963 3 Sheets-Sheet 1
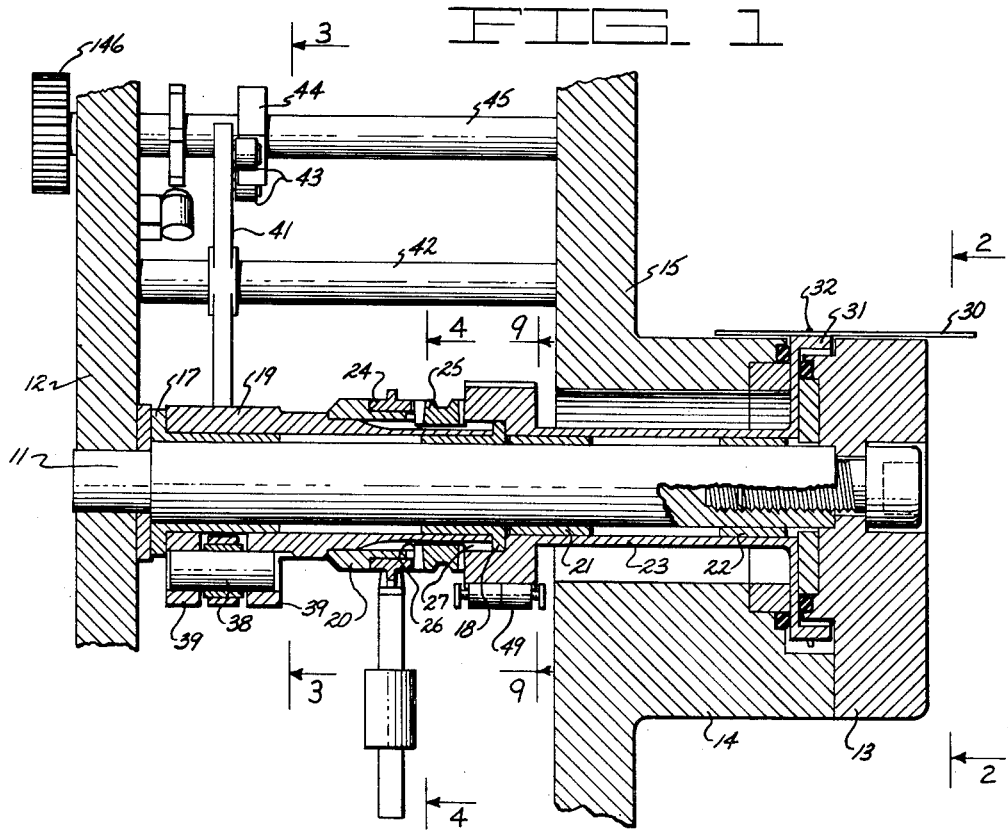
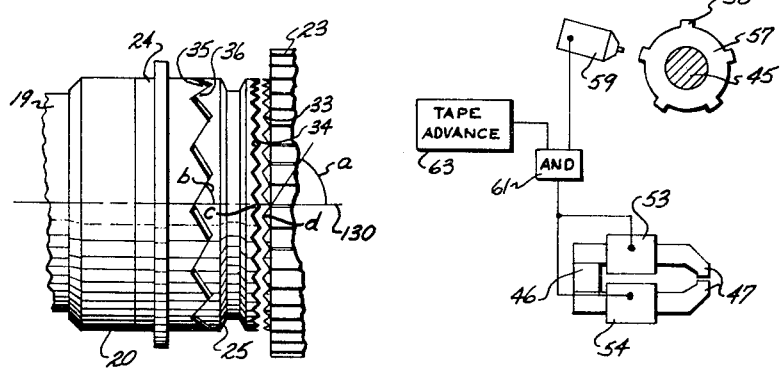
INVENTOR.
RICHARD E. BUSCH
BY
ATTORNEY

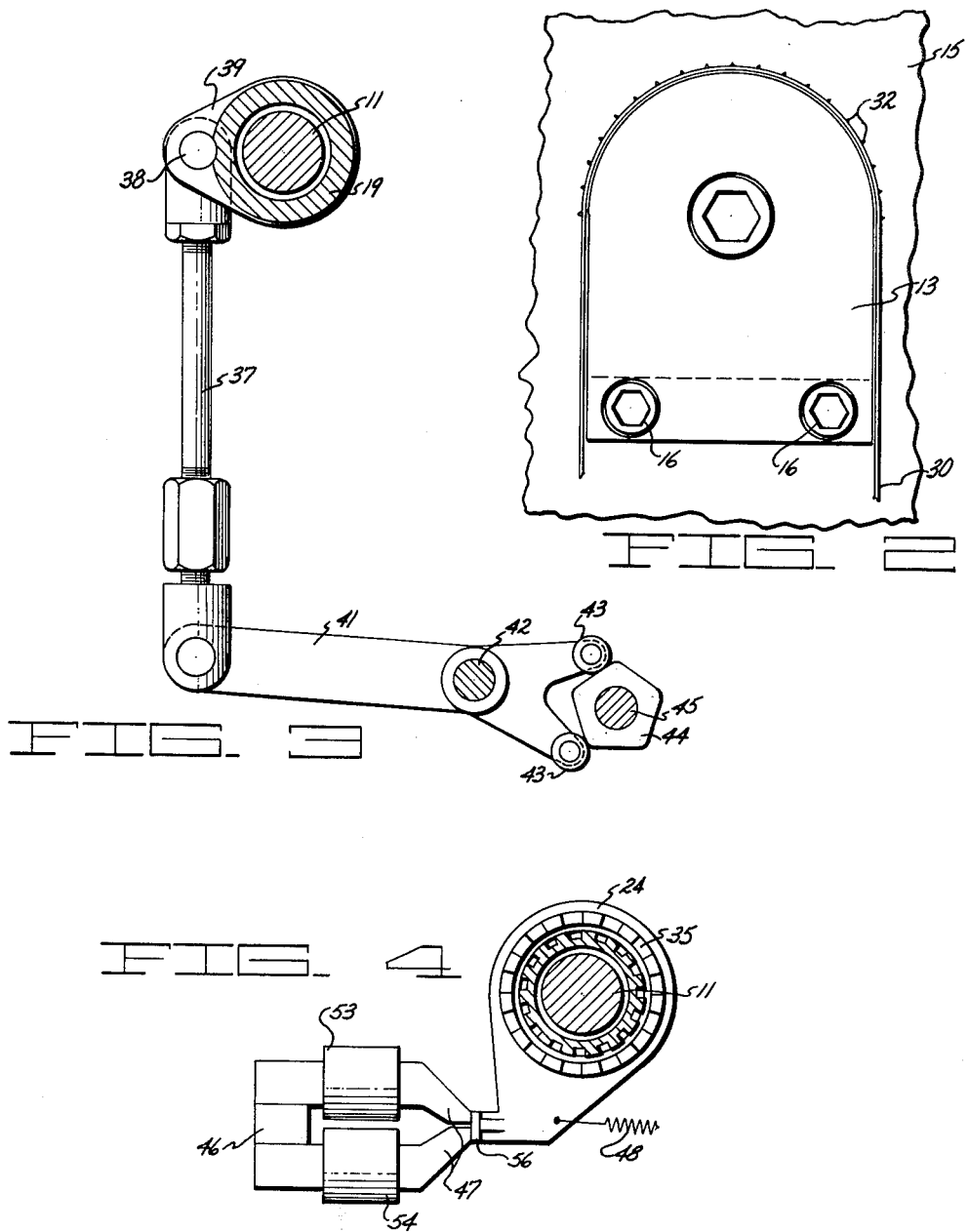

June 30, 1964  R. E. BUSCH  3,138,961
INTERMITTENT DRIVE MECHANISM
Filed May 22, 1963  3 Sheets-Sheet 3
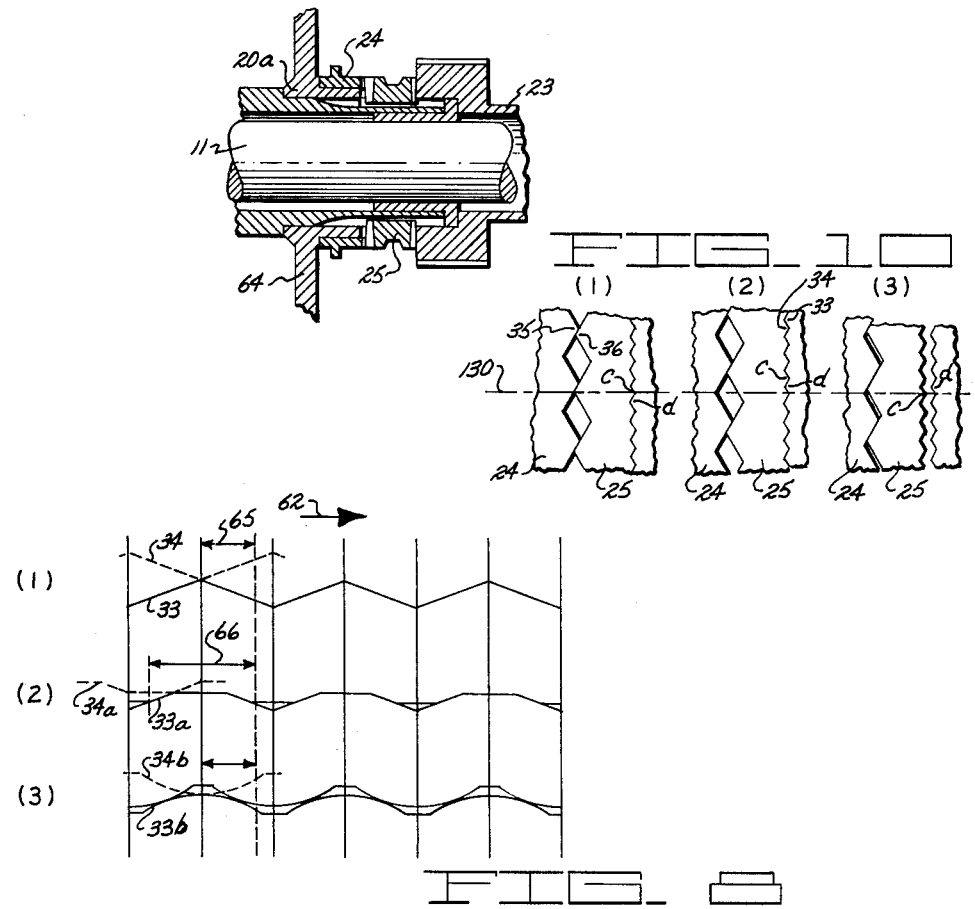
INVENTOR.
RICHARD E. BUSCH
BY 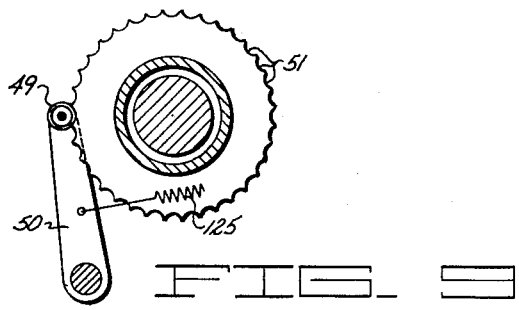
ATTORNEY

United States Patent Office 3,138,961
Patented June 30, 1964

3,138,961
INTERMITTENT DRIVE MECHANISM
Richard E. Busch, La Puente, Calif., assignor to Clary Corporation, San Gabriel, Calif., a corporation of California
Filed May 22, 1963, Ser. No. 286,878
10 Claims. (Cl. 74—126)

This invention relates to high speed, selectively operable intermittent drive mechanisms and has particular reference to intermittently operable drive mechanisms of the type disclosed and claimed in the copending application of Jacob H. Drillick, Serial No. 102,451, filed April 12, 1961, for "Intermittent Drive Mechanism."

The above type intermittent drive mechanism is very satisfactory at relatively high speeds due in part to the fact that it prevents overthrow of the driven element during the latter part of a drive stroke without relying on pawl jamming devices or the like which are excessively noisy and produce undesirable jarring or vibration. However, heretofore, selective operation of an intermittent drive mechanism of the above type required considerable extra mechanism to selectively operate the pawl element thereof through a single stroke whenever it was desired to effect an increment of advance of the driven member.

It therefore becomes a principal object of the present invention to reduce the amount of mechanism required to selectively operate an intermittent drive mechanism of the aforementioned type.

Another object is to provide a simple yet highly reliable device for selectively effecting an incremental advance of an intermittent drive mechanism of the above type.

A further object is to provide a selectively operable intermittent drive mechanism which is capable of high speeds and yet which does not require accurately timed signals to effect operation thereof.

I have discovered that by continuously oscillating the pawl element and normally holding the wedging element of an intermittent drive mechanism of the above type against the action of a yieldable force means, the mechanism will be rendered ineffective until the force means is released to operate the wedging member, at which time the driven member will be incrementally advanced and the wedging element will be returned to a position where it can again be held against the action of such yieldable force means. I have further discovered that the speed of response to a control signal can be best obtained by utilizing a static magnetic device, such as a permanent magnet, to hold the wedging element against the action of the yieldable force means and to employ a bucking coil which, when energized by a control signal, neutralizes the magnetic force of the static magnet to permit the wedging element to become effective. Such construction enables the most efficient use of magnetic properties as a holding and release means.

The manner in which the above and other objects of the invention are accomplished will be readily understood on reference to the following specification when read in conjunction with the accompanying drawings, wherein:

FIG. 1 is a sectioned elevation view of a tape feed mechanism embodying a preferred form of the present invention.

FIG. 2 is an elevational view taken along the line 2—2 of FIG. 1.

FIG. 3 is a transverse section view showing the oscillating actuator and is taken along the line 3—3 of FIG. 1.

FIG. 4 is a transverse section view showing the wedging element holding means and is taken along the line 4—4 of FIG. 1.

FIG. 5 is an enlarged fragmentary view of the oscillating pawl and the wedging element.

FIG. 6 is a schematic view illustrating a timing means for releasing the wedging element.

FIG. 7 is a fragmentary section view similar to FIG. 1 showing a modified form of the invention.

FIG. 8 is a developed view showing in exaggerated form different tooth shapes of the pawl for driving the sprocket.

FIG. 9 is a transverse section view showing the detenting means for the driven member and is taken along the line 9—9 of FIG. 1.

FIG. 10 is a developed view illustrating different positions of the parts during a drive cycle.

The tape feed mechanism, in general, is mounted on a stationary shaft 11 which is supported at one end in a side frame 12 and supported at its opposite end in a cap 13, the latter being bolted through bolts 16, FIG. 2, to a housing 14 formed on a second side frame 15.

A sleeve 19, rotatably supported about the shaft 11 through a pair of bushings 17 and 18, has mounted thereon a support ring 20 and a pawl element 25. The support ring 20 which supports a wedging element 24 is fastened on the sleeve 19 while the pawl 25 juxtaposed thereto is keyed on the sleeve by teeth 26 which mate with a splined section 27 of the sleeve.

A second sleeve 23, rotatably supported about the shaft 11 by a pair of bushings 21 and 22, has integrally formed on the end adjacent the cap 13 a sprocket wheel 31 having a plurality of sprocket pins 32 spaced about the outer periphery thereof for engaging and advancing a perforated strip of paper 30.

The end face of the sleeve 23 adjacent the pawl element 25 and the end face of the pawl 25 have a series of regularly spaced radially extending V-shaped teeth or projections 33 and 34, respectively, whereby to transmit rotary movement from the pawl to the sprocket. Also, the adjacent end faces of the wedging element 24 and the pawl are provided with a second series of regularly spaced radially extending V-shaped teeth or projections 35 and 36, respectively.

The sides of each of the teeth 33 and 34 preferably extend at the same angle "a," FIG. 5, to the coincident axes of the elements 23, 24 and 25 which angle is on the order of 75 degrees. Likewise, the sides of each of the teeth 35 and 36 preferably extend at the same angle "b," which angle is on the order of 73 degrees.

The sleeve 19 is continuously oscillated through an angle equivalent to the pitch of the teeth 33, which in the present case is equal to 10 degrees, by a rod 37 which at one end is pivotally connected through a pin 38, FIG. 3, to a pair of ears 39 integral with the sleeve 19. The opposite end of the rod is pivotally connected to one end of a cam follower 41.

The cam follower 41 is pivotally mounted on a shaft 42 supported in side frames 12 and 15 and has a pair of rollers 43 which cooperate with a pentagon shaped cam 44. The cam is mounted on a continuously rotating shaft 45 driven through a gear 46, FIG. 1, by suitable drive means (not shown).

The wedging element 24, FIGS. 1 and 4, is normally retained in a neutral position under the influence of a permanent magnet 46 through a pair of soft iron extension arms 47 so as to retain the wedge in a clockwise rocked position against the action of a tension spring 48.

To prevent the sleeve 23 from free rotation there is provided a detent roller 49 mounted on a rockable arm 50, FIG. 9, which is yieldably urged counterclockwise by a spring 125 to engage the roller 49 with detent pockets 51 angularly spaced in relationship with the teeth 33 and pins 32.

For ease in understanding the operation of the drive mechanism FIGS. 5 and 10 show the progressive steps involved in advancing the sleeve 23. FIG. 5 shows the wedging element in a clockwise rocked position (as shown in FIG. 4) wherein it is retained by the magnet 46 against the action of the spring 48. The pawl 25 is shown in its extreme counterclockwise position (as viewed in FIG. 4).

FIG. 10, item (1), shows the pawl 25 also in its counterclockwise position but with the wedging element released and thereby rocked counterclockwise under the urging of spring 48. The latter release is effected by energizing a pair of bucking coils 53 and 54 (FIG. 4), causing release of the wedging element from the attraction of magnet 46. Accordingly, the wedging element is rocked counterclockwise causing its teeth 35 to cam the pawl 25 axially to engage the teeth 34 of the pawl with the teeth 33 of the sleeve 23 such that a tooth "c" of the pawl will be positioned just ahead of a tooth "d" of the sleeve 23.

Item (2) of FIG. 10 shows the pawl 25 having been rocked by the cam 44 into its extreme clockwise position. Through the wedging action of the teeth 35 and 36 the pawl has advanced the sleeve 23 one tooth increment as noted by the position of the teeth "c" and "d" relative to a reference line 130.

Item (3) of FIG. 10 shows the pawl 25 at the end of its return stroke in a counterclockwise direction. It will be noted that the sleeve 23 has been detented in its advanced position by the roller 49 and the wedging element has been latched in ineffective position as will appear presently. Accordingly, the pawl will have been cammed axially to the left by the teeth 33 of sleeve 23 to its original axial position shown in FIG. 5. It will be noted that the teeth 33 will be separated axially from the teeth 34 due to the axial momentum developed in pawl 25 at high speeds.

If the wedging element is not released to effect a drive the pawl 25 will continue to oscillate both axially and about its axis between the positions shown in items (2) and (3), FIG. 10, without advancing the sleeve 23.

When the pawl is driving the sleeve 23 it also drives the wedge element against the action of its spring 48 so that as the wedge approaches the end of the stroke a soft iron armature 56 (FIG. 4) attached thereto will come to rest against the arms 47 of the magnet and since the pulse to the bucking coils 53 and 54 has died out at this time the wedge will again latch to the magnet thereby allowing the pawl on subsequent strokes to ratchet back and forth until the wedge is again released by pulsing the bucking coils.

As shown in FIG. 1 the support ring 20 will oscillate with the sleeve 19 and provides a full bearing surface for the wedge 24 in lieu of the splined section 27.

Since all surfaces surrounding the wedge 24 are oscillating surfaces the pulsing of the coils 53 and 54 becomes somewhat critical in that the wedge, if released during the previous return stroke of the pawl and before the apex or flat of a tooth 34 passes the apex or flat of an adjacent tooth 33, would have a tendency to drive the sleeve 23 back one stroke.

Therefore, as shown in FIG. 8, item (1), it can be seen that when the teeth 34 are returning or ratcheting in the direction of the arrow 62 the control pulse may be applied at any time within a range 65 which is approximately three-eighths of the stroke.

By reshaping the teeth to that shown in item (2) wherein the teeth 33a and 34a are truncated, a larger pulse tolerance is permitted as indicated by the range 66. That is, approximately five-eighths of the ratchet stroke is allowed for such pulse while requiring a smaller axial movement of the pawl.

A third tooth form is shown in item (3) wherein the teeth 33a and 33b are rounded to provide a smoother and quieter action but having the same pulse tolerance as that shown at (1) while providing for less axial movement of the pawl.

The selection of a tooth shape for teeth 33 and 34 depends upon desired results. That is, the tooth shape shown in item (1) is the most economical to machine but requires a closer pulse range tolerance. The second tooth shape shown in item (2) does not require as close pulse range tolerance and is somewhat quieter but involves more machining, and the third tooth shape shown in item (3) requires a close pulse range tolerance and intricate machining but produces a smoother and a quieter action.

A means for timing the pulsing of the coils 53 and 54 is shown in FIG. 6, wherein a metal disc 57 is mounted on the shaft 45 (see also FIG. 1). The disc has projections 58 spaced about its outer periphery in appropriate angular relationship with the lobes of the cam 44, so as to induce timed pulses in an inductance type pick-up head 59 which may be of any well known type.

Each pulse from the read head passes to one input of an "and" gate 61 whereupon if a paper advance pulse from some control center 63, such as a computer, is concurrently applied to a second input of the gate, the gate will apply a control pulse to the coils 53 and 54. The magnetic flux generated by the coils counteracts the magnetic flux of the magnet 46 thereby releasing the wedge 24 to the action of its spring.

Shown in FIG. 7 is an alternate form of the invention wherein the parts are the same as those shown in FIGS. 1 to 6 except that the support ring 20a is formed as a stationary support, being formed integral with a side frame 64. Such ring relieves the wedge 24 from the influence of the oscillating parts so that release of the wedge to the action of the spring 48 before the apices of the teeth 33 reach the apices of the teeth 34 will not provide enough control to operate the sleeve 23 in a reverse stroke, thereby allowing a larger pulse range tolerance than can be achieved by the construction shown in FIGS. 1 to 6.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A selectively operable intermittent drive mechanism comprising the combination of a rotatable driven element, an oscillatable pawl element, one of said elements having a plurality of teeth therearound, the other of said elements having at least one tooth engageable with said first mentioned teeth, means for oscillating said pawl element, a wedging element movable relative to said pawl element, said pawl element and said wedging element having cooperative wedge formations thereon, means for yieldably urging said wedging element in a first direction to wedge said pawl element in driving engagement with said driven element during movement of said pawl element in the opposite direction, and means comprising a latching device for selectively rendering said yieldable means ineffective to urge said wedging element in said first direction whereby to prevent said pawl element from driving said driven element.

2. A selectively operable intermittent drive mechanism according to claim 1 wherein said wedging element and said second mentioned means permits said pawl element to withdraw from driving engagement with said driven element during movement of said pawl element in said first direction.

3. A selectively operable intermittent drive mechanism comprising the combination of a rotatable driven element, an oscillatable pawl element, one of said elements having a plurality of teeth thereon, the other of said elements having at least one tooth engageable with said first mentioned teeth, means for oscillating said pawl element, a wedging member movable relative to said pawl element, said pawl element and said wedging member having cooperative wedge formations thereon, means for yieldably urging said wedging element in a first direction to wedge said pawl element in driving engagement with said driven element during movement of said pawl element in the opposite direction, means for holding said wedging element against the action of said yieldable means whereby to prevent said wedging element from wedging said pawl element into driving engagement with said driven element, and means for selectively releasing said holding means comprising a magnetic device.

4. A selectively operable intermittent drive mechanism according to claim 3 wherein said last mentioned means comprises a first device for producing a release signal, a second device operable in time with said pawl device for producing a timing signal during movement of said pawl in said first direction only, and means controlled jointly by said release signal and said timing signal for causing said magnetic device to release said holding means.

5. A selectively operable intermittent drive mechanism comprising the combination of a rotatable driven element, an oscillatable pawl element, one of said elements having a plurality of teeth thereon, the other of said elements having at least one tooth engageable with said first mentioned teeth, means for oscillating said pawl element, a wedging member movable relative to said pawl element, said pawl element and said wedging member having cooperative wedge formations thereon, spring means for urging said wedging element in a first direction to wedge said pawl element in driving engagement with said driven element during movement of said pawl element in the opposite direction, said pawl element advancing said wedging element against the action of said spring means during movement of said pawl element in said opposite direction, magnetic means for holding said wedging element in advanced position, and means for selectively causing said magnetic means to release said wedging element to the action of said spring means.

6. A selectively operable intermittent drive mechanism comprising the combination of a rotatable driven element, an oscillatable pawl element, one of said elements having a plurality of teeth therearound, the other of said elements having at least one tooth engageable with said first mentioned teeth, means for oscillating said pawl element, a wedging element movable relative to said pawl element, said pawl element and said wedging element having cooperative wedge formations thereon, means for yieldably forcing said wedging element in a first direction to wedge said pawl element in driving engagement with said driven element during movement of said pawl element in the opposite direction, said pawl element advancing said wedging element against the action of said yieldable means during movement of said pawl element in said opposite direction, magnetic means for holding said wedging element in advanced position, said magnetic means being ineffective to move said wedging element, and means for releasing said magnetic means from said wedging element during a predetermined period only in the oscillation of said pawl element.

7. A selectively operable intermittent drive mechanism comprising the combination of a driven element, a wedging element, a pawl intermediate said elements, means supporting said pawl and said elements for relative movement about a common axis, said last mentioned means permitting axial movement of said pawl, means for oscillating said pawl about said axis, means for yieldably forcing said wedging element in one direction about said axis, said pawl and said driven element having a first set of interengaging projections, each of said first set of projections having a driving surface and a non-driving surface, the non-driving surfaces of said projections extending at an angle to the direction of movement of said pawl about said axis, said pawl and said wedging element having a second set of interengaging projections, each of said second set of projections having interengaging surfaces extending at an angle to the direction of movement of said pawl about said axis, said pawl being movable away from said driven element by said non-driving surfaces of said first set of projections during rocking of said pawl in said one direction, said pawl advancing said wedging element in an opposite direction during movement of said pawl in said opposite direction, means comprising said yieldable means and said second set of projections for maintaining said pawl in driving engagement with said driven element during movement of said pawl in said opposite direction, and means comprising a magnetic device for selectively rendering said spring means ineffective to move said wedging element during rocking of said pawl in said first direction whereby to prevent said pawl from driving said driven element.

8. A selectively operable intermittent drive mechanism comprising the combination of a rotatable driven element, a pawl element oscillatable about the axis of said driven element, one of said elements having a plurality of teeth thereon, the other of said elements having at least one tooth engageable with said first mentioned teeth, means for continuously oscillating said pawl element, a wedging member movable about said axis on the side of said pawl element opposite from said driven element, said pawl element and said wedging member having cooperating wedge formations thereon, means for yieldably urging said wedging element in a first direction about said axis to wedge said pawl element in driving engagement with said driven element during movement of said pawl element in the opposite direction about said axis, said wedging element permitting said pawl element and said second mentioned means to withdraw axially from driving engagement with said driven element during movement of said pawl element in said first direction, means comprising a magnetic device for holding said wedging element against the action of said yieldable means whereby to prevent said wedging element from wedging said pawl element into driving engagement with said driven element, and means for selectively actuating said magnetic device to release said wedging element.

9. A selectively operable intermittent drive mechanism according to claim 8 wherein said last mentioned means comprises a first device for producing a release signal, a second device operable in time with said pawl element for producing a timing signal during movement of said pawl element in said first direction only, and means controlled jointly by said release signal and said timing signal for causing said magnetic device to release said holding means.

10. A selectively operable intermittent drive mechanism comprising the combination of a rotatable driven element, a pawl element oscillatable about the axis of said driven element, one of said elements having a plurality of teeth thereon, the other of said elements having at least one tooth engageable with said first mentioned teeth, a wedging element movable about said axis on the side of said pawl element opposite from said driven element, said pawl element and said wedging element having cooperative wedge formations thereon, means for yieldably urging said wedging element in a first direction about said axis to wedge said pawl element in driving engagement with said driven element during movement of said pawl element in the opposite direction about said axis, said wedge element and said means permitting said pawl element to withdraw axially from driving engagement with said driven element during movement of said pawl element in said first direction, means for holding said wedging element against the action of said yieldable means whereby to prevent said wedging element from wedging said pawl element in driving engagement with said driven element, means comprising a magnetic device for selectively releasing said holding means, and means for retaining said driven element in said advanced position while said pawl element is withdrawn axially from driving engagement with said driven element during movement of said pawl element in said first direction.

No references cited.